United States Patent [19]

David

[11] 3,938,657
[45] Feb. 17, 1976

[54] BLIND RIVET ASSEMBLY

[76] Inventor: Melvin J. David, 16221 Quemada Road, Encino, Calif. 91316

[22] Filed: Apr. 26, 1974

[21] Appl. No.: 464,447

Related U.S. Application Data

[62] Division of Ser. No. 307,119, Nov. 16, 1972.

[52] U.S. Cl. .................. 206/343; 206/820; 85/37
[51] Int. Cl.² ........................................ B65D 85/24
[58] Field of Search .......... 206/343, 346, 347, 348, 206/338, 820, 329, 486, 493; 85/78, 37, 39, 17; 227/136

[56] References Cited
UNITED STATES PATENTS

| | | | |
|---|---|---|---|
| 1,112,417 | 9/1914 | Kennedy | 85/78 |
| 2,784,405 | 3/1957 | Working, Jr. | 206/347 |
| 2,964,171 | 12/1960 | Chadwick | 206/820 |
| 3,171,535 | 3/1965 | Harris | 206/329 |
| 3,202,270 | 8/1965 | Schory et al. | 206/348 |
| 3,211,284 | 10/1965 | Anstett | 206/346 |
| 3,211,352 | 10/1965 | Anstett | 227/136 |
| 3,452,638 | 7/1969 | Lawer | 85/37 |
| 3,515,419 | 6/1970 | Baugh | 85/39 |
| 3,779,373 | 12/1973 | Maier | 85/17 |

Primary Examiner—William T. Dixson, Jr.

[57] ABSTRACT

Apparatus for permitting blind rivet elements to be installed utilizing automatic insertion equipment. A blind rivet carrier element having a predetermined width and thickness is adapted for receiving the body of the blind rivet, blind rivet bodies being uniformly disposed longitudinally along the carrier element. The blind rivet body is removably secured to a surface of the carrier element. Indentations are disposed longitudinally along the carrier element to provide for flexibility of the carrier element and simplifying the adaptation thereof to automatic insertion equipment.

5 Claims, 7 Drawing Figures

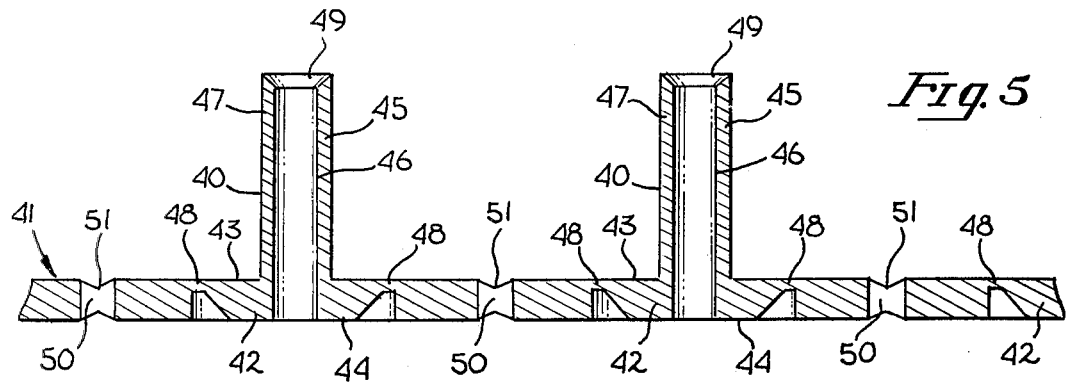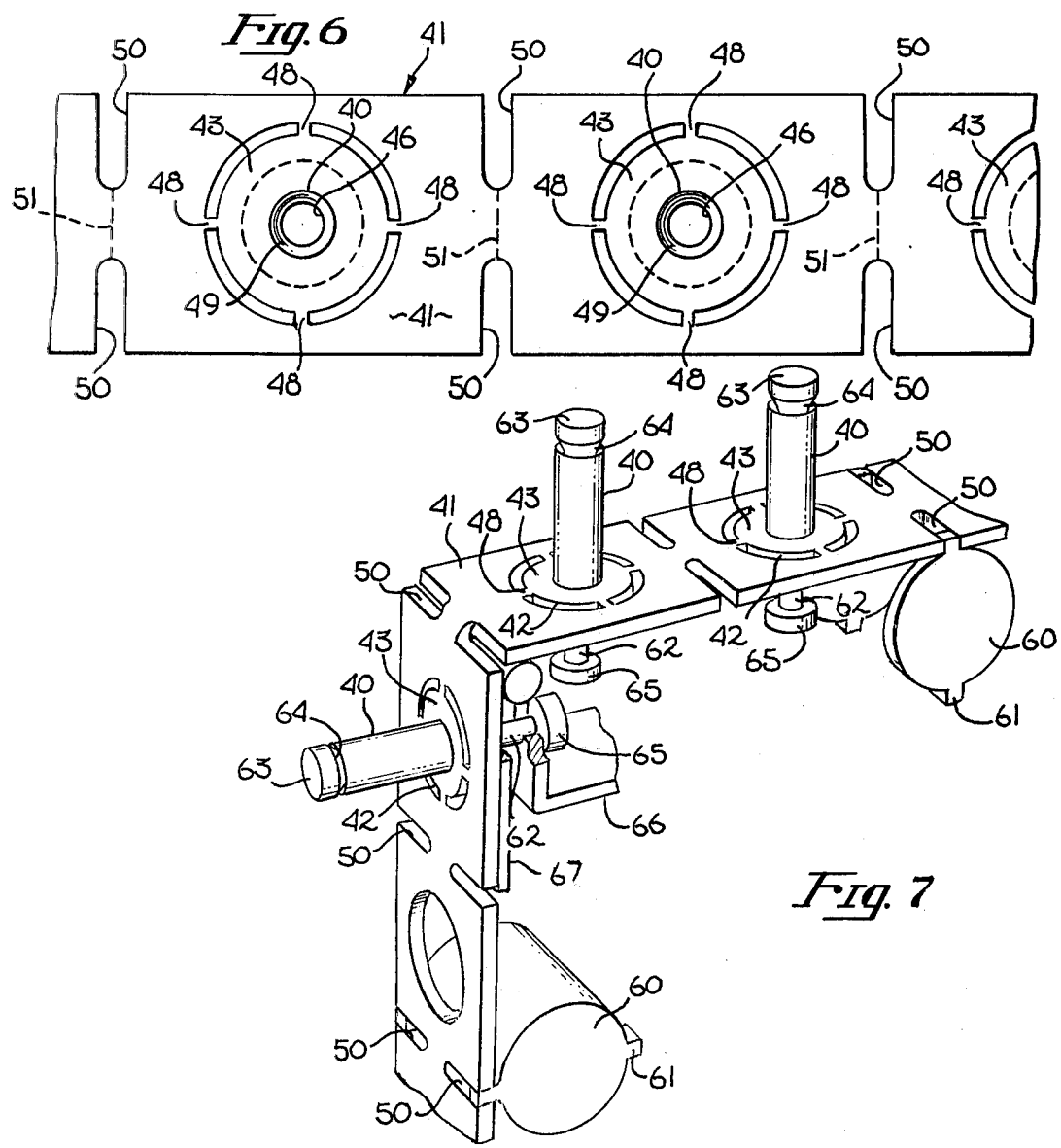

BLIND RIVET ASSEMBLY

This is a division of application Ser. No. 307,119, filed Nov. 16, 1972.

BACKGROUND OF THE INVENTION

1. Field of the Invention

The present invention relates generally to blind riveting devices and, more particularly, to those devices which facilitate automatic insertion of blind rivets.

2. Prior Art

The use of blind riveting is a procedure which is well known in the prior art as exemplified by numerous disclosed blind rivet devices. The typical blind rivet disclosed in the prior art constitutes a tubular body having a radially projected head at one end thereof, the other end being formed into a structure which is adapted to receive the rivet forming head of a pulling stem or mandrel. The mandrel has at one end thereof the enlarged, rivet forming head having a beveled surface adapted to intimately contact the receiving surface at the end of the rivet body.

The description set forth hereinabove partially describes all of the blind rivets disclosed in the prior art. In the prior art, devices differ in the manner in which the rivet body is set within the working piece. Some of the devices disclosed by the prior art provide a mandrel which is screwthreaded or otherwise capable of being gripped by a pulling tool at the axial end opposite the enlarged end thereof. In addition, some of the devices disclosed by the prior art provide a break-off groove intermediate the gripping portion and enlarged head so that the mandrel will break when a predetermined level of axial stress is placed thereon.

All of the devices disclosed by the prior art are deficient in substantially one characteristic. All of the devices are so constructed that the blind rivets must be individually set within the working piece after which the mandrel is gripped and pulled to set the rivet within the working piece. Because of the configuration of the mandrel on substantially all of the devices disclosed in the prior art, the blind rivets are not capable of being used with automatic insertion equipment.

The present invention substantially solves the problems which have heretofore been unresolved by the devices disclosed in the prior art. A carrier element having a predetermined width and longitudinal length has rivet bodies disposed therein at uniform intervals. Apertures are disposed along the longitudinal dimension of the carrier element intersticial with the rivet bodies for providing accurate means for registering the carrier element and rivet bodies within any automatic insertion equipment being used. The rivet bodies being removably secured along the carrier element provide an improved blind rivet assembly which permits the blind rivets to be inserted within a workpiece utilizing automatic insertion equipment.

SUMMARY OF THE INVENTION

The present invention comprises a blind rivet assembly which adapts the process of blind riveting to be used with automatic insertion equipment. The present invention comprises a carrier strip substantially having a longitudinal length which is adapted to receive rivet bodies. The rivet bodies are uniformly disposed along the longitudinal dimension of the carrier element. By providing registration means intersticial with the rivet bodies, the carrier element can be properly aligned and registered with a pulling element which will allow the rivet to be properly disposed within a workpiece after which the mandrel for forming the rivet can be extracted. Where the carrier element of the present invention is constructed of material which is more rigid than plastic, paper or other flexible materials, the registration apertures also allow the carrier element to be deflected because of the recondition of the carrier element. In this manner, the portion of the carrier element bearing a rivet body can be properly positioned without substantial regard to the physical dimensions of the rivet body or mandrel. In a form of the present invention, the carrier element is constructed from a malleable or readily formable material such as an aluminum alloy which will permit ready formation of the blind rivet head and still provide sufficient strength in the rivet. When using this type of material for the formation of the carrier element, the rivet body is formed therein through the use of successive punch and die operations whereby the rivet body is formed from the carrier element. In this manner, the rivet body and carrier element form a combination which is readily receivable by conventional automatic insertion equipment and thereby provide an easily usable blind rivet assembly which substantially overcomes the dieffiencies of those devices disclosed in the prior art.

It is therefore an object of the present invention to provide an improved blind rivet assembly.

It is another object of the present invention to provide a blind rivet assembly adaptable for use with automatic insertion equipment.

It is yet another object of the present invention to provide a blind rivet assembly having a rivet body integral with a carrier element.

It is still yet another object of the present invention to provide a blind rivet assembly which is inexpensive and simple to fabricate.

The novel features which are believed to be characteristic of the invention, both as to its organization and method of operation, together with further objectives and advantages thereof, will be better understood from the following description considered in connection with the accompanying drawing in which a presently preferred embodiment of the invention is illustrated by way of example. It is to be expressly understood, however, that the drawing is for the purpose of illustration and description only and is not intended as a definition of the limits of the invention.

BRIEF DESCRIPTION OF THE DRAWING

FIG. 5 is a side elevation, cross-sectional view of another form of a blind rivet assembly illustrating the blind rivet bodies in accordance with the present invention.

FIG. 6 is a top plan view of the form of the present invention shown in FIG. 5.

FIG. 7 is a perspective view of a form of the present invention being used with typical automatic insertion equipment.

DESCRIPTION OF THE PRESENTLY PREFERRED EMBODIMENT

Figure 1:
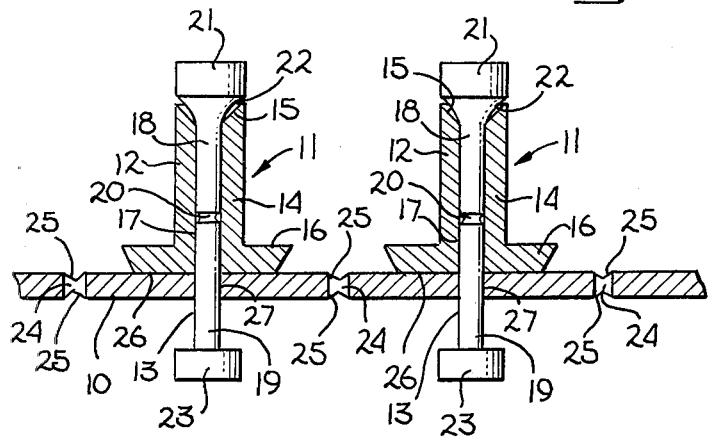
FIG. 1 is a partial cross-sectional view of a blind rivet assembly in accordance with the present invention.

An understanding of the present invention can be best gained by reference to FIG. 1 wherein a side elevation, partial cross-sectional view of a form of the present invention blind rivet assembly is shown. The present invention generally comprises carrier element 10 upon which are removably disposed blind rivets 11 generally designated by the reference numeral 11. Blind rivets 11 are comprised of rivet body 12 and a pulling stem or mandrel 13.

Rivet bodies 12 generally are constructed of a malleable and readily formable material which will permit ready formation of the blind rivet head and still be of sufficient strength when mounted within the workpiece. Rivet body 12 is generally fabricated of conventional material such as aluminum alloy although other suitable materials can be used. Rivet body 12 comprises a substantially cylindrical member 14 typically having a beveled surface 15 at one end thereof, the other end being extended into integral preformed rivet head 16. Inner cylindrical surface 17 is extended through stem or mandrel 13 and integral preformed rivet head 16.

Pulling stem or mandrel 13 is comprised of body sections 18 and 19 in axial opposition to one another and separated by integral annular groove 20. Body section 18 is depended into an enlarged rivet forming head 21, forming head 21 having beveled surface 22 adapted to suitably contact beveled surface 15 of rivet body 12.

Body section 19 of mandrel 13 provides one improvement to the present invention blind rivet assembly which allows same to be utilized with automatic insertion equipment. Body section 19 is depended into enlarged pulling head 23. As will be explained in detail below, pulling head 23 allows mandrel 13 to exert the appropriate force on cylindrical member 14 to provide the blind rivet in a manner which has heretofore not been accomplished.

Carrier element 10 is used for supporting the uniformly disposed rivet bodies 12. As can be seen in FIG. 1, rivet bodies 12 and mandrel 13 are uniformly spaced along carrier element 10, registration indicia or apertures 24 being disposed along the transverse edges of carrier element 10 and interposed between rivet bodies 12 and mandrels 13 at uniform distances. Although FIG. 1 only illustrates one edge of carrier element 10, registration indicia or apertures 24 are in opposition to one another along both transverse edges of the carrier element 10. As stated previously, one of the objects of the present invention is to adapt the present invention for use with automatic insertion equipment. Where insertion equipment requires that carrier element 10 be sufficiently flexible so that the direction of blind rivet body and mandrel 13 can be changed, perforations 25 are disposed intermediate the apertures 24 disposed in transverse edges of carrier element 10, perforations 25 providing points along which carrier element 10 can be folded or otherwise change its planar relationship with the remainder of carrier element 10. This will be explained in greater detail hereinbelow.

In order to operate the present invention, the top surface of preformed rivet head 16 is removably secured to the top surface of carrier element 10. In this manner, rivet body 12 will be removed from carrier element 10 after the blind rivet is formed. In the form of the present invention shown in FIG. 1, carrier element 10 is fabricated from flexible but sturdy material such as heavy paper, cardboard or flexible plastic. Where carrier element 10 is fabricated of the heretofore described materials, rivet body 12 can be secured thereto by conventional glues or other adhesive materials. The construction of the present invention blind rivet assembly requires also that apertures 27 be disposed through the top and bottom surface of carrier element 10 and be adapted to receive body section 19 of mandrel 13. Apertures 27 will be aligned with the uniform inner diameter of rivet body 12.

The manner of constructing the blind rivet assembly shown in FIG. 1 utilizes conventional techniques. After forming apertures 27 and carrier element 10, rivet bodies 12 are affixed to the surface of carrier element 10, the inner-diameter thereof being aligned with apertures 27. One of the methods for fabricating mandrel 13 is to form mandrel 13 without pulling head 23. After mandrel 13, absent pulling head 23, is inserted within rivet body 12, and through apertures 27, pulling head 23 can be mounted by conventional welding processes which are well known in the art.

Figure 2:
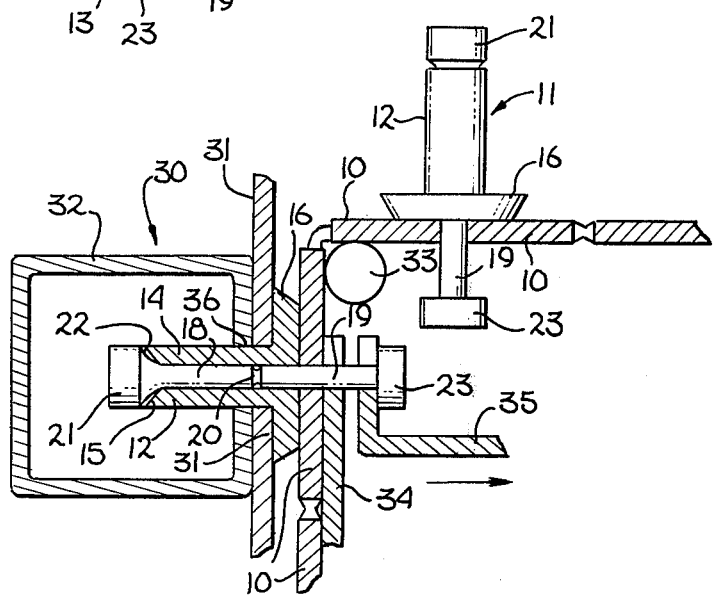
FIG. 2 is a side elevation partial cross-sectional view of a form of the present invention being inserted within a subject workpiece.
Figure 4:
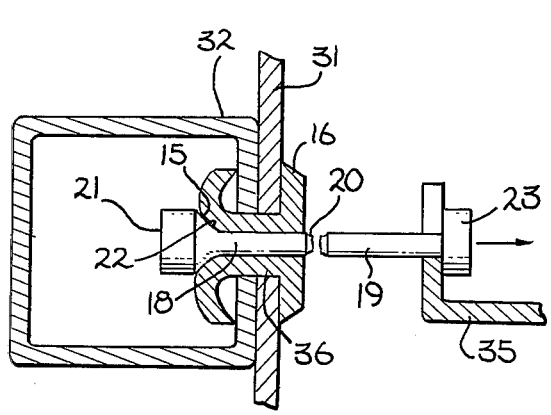
FIG. 4 is a side elevation, partial cross-sectional view of a blind rivet made with a blind rivet assembly in accordance with the present invention.

Operation of the form of the present invention blind rivet assembly shown in FIG. 1 is best seen by reference to FIG. 2 and FIG. 4 which illustrate the typical mounting and insertion of a blind rivet within a workpiece. For the purpose of illustration, workpiece 30 comprises metal elements 31 and 32, element 32 constructed in a manner which will require a blind rivet to couple element 32 to element 31. The schematic illustration of automatic insertion equipment necessary for use with the present invention is shown in generalized form in FIG. 2, the only necessary elements to be shown are rollers 33 being used to alter the direction of carrier element 10 for the purpose of insertion, the remaining elements being anvil 34 and pulling arm 35. The manner of constructing automatic insertion equipment for utilizing the present invention is beyond the scope of this application and is not considered as a part of the present invention.

After placement of workpiece 30, the blind rivet is positioned with rived body 12 being inserted through aligned apertures 36 through elements 31 and 32 of workpiece 30. Preformed rivet head 16 is in abuttment with element 31 if workpiece 30, anvil 34 being urged against the bottom surface of carrier element 10 to provide a base against which force on mandrel 13 can be exerted.

Figure 3:
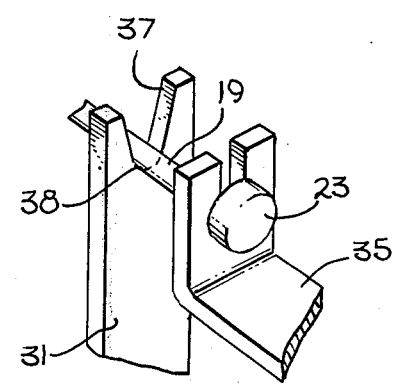
FIG. 3 is a perspective view of a typical anvil and pulling element to be used for forming blind rivets with a blind rivet assembly in accordance with the present invention.

Referring briefly to FIG. 3, an enlarged schematic view of anvil 34 and pulling arm 35 can be seen. Anvil 34 provides tapered opening 37 along the top surface thereof so that it may be moved upwardly and aligned body section 19 of mandrel 13 at the apex 38 of tapered opening 37. The portions of anvil 34 forming tapered opening 37 will provide a sufficient base against which force can be exerted on mandrel 13. Pulling arm 35 is also moved up to grip pulling head 23 adjacent its interface with body section 19. By providing the proper base by anvil 34, pulling arm 35 can exert an appropriate force on pulling head 23 to form the blind rivet.

Referring again to FIG. 2 and FIG. 4, it can be seen that pulling arm 35 is in an appropriate position and in abuttment with the bottom surface of pulling head 23.

In this configuration, the stationary position of anvil 34 will support preformed rivet heads 16 and workpiece 30. By moving pulling arm 35 in the position shown in FIG. 2, axial force will be imposed on mandrel 13. FIG. 4 illustrates the typical formation of a blind rivet. Pulling arm 35 has imposed sufficient axial force on pulling head 23 and body section 19 to cause annular groove 20 to fracture. Prior to fracturing mandrel 13 at annular groove 20, the force imposed by the beveled surface 22 of rivet forming head 21 on the beveled surface 15 or rivet body 12 will cause the malleable material used to form rivet body 12 to be deformed in a manner typical to that shown in FIG. 4. As can be seen in FIG. 4, the end of rivet body 12 adjacent forming head 21 has been deformed beyond the confines of apertures 36 through the workpiece thereby securing elements 31 and 32 between preformed rivet head 16 and the deformed portion of rivet body 12. After the fracture of mandrel 13 at annular groove 20, body portion 18 can be removed if necessary from the formed blind rivet.

An understanding of another form of the present invention can be best gained by reference to FIG. 5 wherein an enlarged, side elevation cross-sectional view is shown. In the form of the present invention illustrated in FIG. 5 and FIG. 6, a rivet body 40 is directly formed from the material making up carrier element 41. In this case, carrier element 41 is constructed from a malleable and readily formable material such as an aluminum alloy so as to provide sufficient flexibility in the use of the present invention blind rivet assembly as well as providing the structural sturdiness necessary to form and maintain a suitable rivet. In the form of the present invention shown in FIG. 5, preformed rivet head 42 has top and bottom surfaces 43 and 44 respectively which are coplanar with the respective surfaces of carrier element 41. In the form of the present invention shown in FIG. 5, surface 43 of preformed rivet head 42 will be placed in abutment with the applicable workpiece.

To form rivet body 40, carrier element 41 is subjected to a conventional drawing process whereby cylindrical body 45 is drawn from the material of carrier element 41. Using conventional process steps, cylindrical body 45 is sequentially drawn to the appropriate inner and outer diameters after which cylindrical body 45 is trimmed to the proper length.

Preformed rivet head 42 is machined so that it is removably secured within the remaining material of carrier element 41. The form of the present invention shown in FIG. 5 and FIG. 6 illustrates the use of a number of remaining bridging elements 48 between carrier element 41 and the machined preformed rivet head 42. Although the form of the present invention shown in FIG. 5 and FIG. 6 utilizes bridging elements 48, these are for the purpose of illustration and description only, the machining of preformed rivet head 42 in a manner which will leave it in a removably secure position within carrier element 41 can utilize other conventional machining steps which are well known to persons having skill in the machining art.

Referring again to FIG. 5 and FIG. 6, where a mandrel of the type shown in FIG. 1 is employed, the end portion of cylindrical body 45 is countersunk to provide beveled surface 49 in the end thereof. In this manner, rivet body 40 is substantially the same as that shown in the form of the present invention shown in FIG. 1, the sole exception being that rivet body 40 is constructed directly from a metallic carrier element 41.

The use of beveled surface 49 is illustrated for the purpose of description only. Where other mandrel configurations are employed, the end portion of cylindrical body 45 can be modified accordingly.

To provide for flexibility in the use of carrier element 41, registration indicia or apertures 50 are disposed in the transverse edges of carrier element 41 in opposition to one another. The function of apertures 50 in addition to providing flexibility and ease of movement for carrier element 41 also provides means whereby each rivet body 40 can be properly aligned and registered with the particular workpiece as is shown to be necessary in FIGS. 2 and 4 discussed hereinabove. To provide additional flexibility, perforation 51 can be disposed in the remaining portion of carrier element 41 interposed between apertures 50 to insure that carrier element 41 can be pivoted or otherwise deflected in a manner which will permit appropriate positioning of rivet body 40 for the blind riveting process.

Where the form of the present invention shown in FIG. 5 and FIG. 6 is to be used with a preformed mandrel, a mandrel substantially in the form of that shown in FIG. 1 can be constructed and inserted in the same manner as was described hereinabove. It is to be noted that the form of the present invention shown in FIG. 5 can be utilized with insertion equipment which requires a mandrel having no pulling head such as that designated as reference numeral 23 whereby the blind rivet is formed by gripping or otherwise pulling a mandrel through rivet body 12 conforming the blind rivet in a manner which is substantially similar to that shown in FIG. 4.

Referring now to FIG. 7, an example of the use of the form of the present invention shown in FIG. 5 is shown, the operation shown in FIG. 7 utilizing a mandrel typical of the type shown in FIG. 1. Referring now to FIG. 7, carrier element 41 is mounted upon a schematically depicted automatic insertion apparatus having registration gears 60. In the example shown in FIG. 7, registration gears 60 will typically utilize pawls 61 which are either circumferentially spaced or mounted upon a gear which will permit uniform engagement consistent with the spacing between apertures 50. Although the example shown in FIG. 7 utilizes a registration gear 60 having diametrically opposed pawls 61, it is obvious that a different number of pawls could be used consistent with the diameter of the registration gear being used.

Each rivet body 40 is uniformly spaced along carrier element 41, surface 43 of preformed rivet head 42 being exposed for insertion into a workpiece. As stated, the mandrel used with the form of the present invention shown in FIG. 7 is typically the type shown in FIG. 1. Mandrel 62 is disposed through cylindrical body 45 of rivet body 40, the diameter of mandrel 62 being suitable for movement within the inner diameter 46 of rivet body 40. Mandrel 62 is depended into rivet forming head 63 at the outer end of the rivet body 40, rivet forming head 63 having beveled surface 64 for cooperatively engaging beveled surface 49 of rivet body 40. Pulling head 65 depends from the remaining end of mandrel 62 in a manner consistent with that described in FIG. 1. Pulling head 65 is adapted to be engaged by pulling arm 66. In a like manner to that described in FIGS. 2, 3 and 4, anvil 67 is moved into engagement with mandrel 62 to provide a base for preformed rivet head 42 against which force can be exerted on pulling head 65. Severing preformed rivet heads 42 from carrier element 41 at bridging elements 48 is accomplished by the force exerted on pulling head 65 or alternatively by a conventional punch incorporated within the automatic insertion equipment being used.

The form of the present invention shown in FIGS. 5, 6 and 7 permits rivet body 40 to be constructed from the malleable material used to construct carrier element 41. In this manner, rivet body 40 can easily be extracted from carrier element 41 because of the weak bond formed by bridging elements 48. This form of the present invention is also easily used with an insertion gun which employs a gripping means or other type of pulling technique which does not require pulling head 65. The present invention therefore provides a blind rivet assembly which is easily adaptable for automatic insertion techniques. Since each rivet body is uniformly disposed along its carrier element and is adapted for easy registration, the ability to align a number of sequential workpieces and adapt same for receiving a blind rivet is accomplished. By providing a structure which is flexibled yet sturdy and providing an assembly which can be used with various types of insertion tools and mechanisms, the present invention provides a simple and improved blind rivet assembly which solves substantial problems which have heretofore remained unsolved by the devices disclosed in the prior art.

I claim:

1. In a blind rivet assembly, a blind rivet carrier element comprising a malleable metallic strip having said plurality of rivet bodies uniformly disposed thereon, said rivet bodies comprising a preformed rivet head having a top and bottom surface coplanar with the top and bottom surfaces of said blind rivet carrier strip, said preformed rivet head being coupled to said carrier strip by breakable bridging elements therebetween, said preformed rivet head being depended into a cylindrical body having a uniform inner and outer diameter, said inner diameter being extended through said preformed rivet head and the end of said cylindrical body opposite said preformed rivet head being countersunk downwardly from the outer to the inner diameter thereof, said carrier element further including registration means for aligning said rivet bodies being disposed in opposition to one another along the transverse edges of said strip intermediate said rivet bodies and including perforation means for bending said carrier element interposed between said opposed registration means.

2. A blind rivet assembly as defined in claim 1, said assembly including a mandrel comprising:
   a. a cylindrical body having first and second portions, said portions having a breakable annular groove disposed therebetween, said cylindrical body being slidably disposed within said rivet body;
   b. a rivet forming head depending from a first end of said mandrel external to said rivet body and having an outer diameter coextensive with the outer diameter of said rivet body, said rivet forming head having a beveled surface adjacent said mandrel body adapted to cooperatively engage the countersunk surface of said rivet body; and
   c. a pulling head depending from the second end of said mandrel, said pulling head having a diameter greater than the diameter of said mandrel and being spaced from said preformed rivet head.

3. A blind rivet assembly comprising a malleable, metallic rivet body carrier strip having a uniform transverse width and including a plurality of rivet bodies uniformly disposed therein, said rivet bodies comprising a pre-formed rivet head having a top and bottom surface coplanar with the top and bottom surfaces of said carrier strip, said preformed rivet head being coupled to said carrier strip by breakable bridging elements therebetween, said preformed rivet head being extended into a cylindrical body having a uniform inner and outer diameter, said inner diameter being extended through said pre-formed rivet head, and the end of said cylindrical body opposite said preformed rivet head having a reduced diameter from the outer to the inner diameter thereof, the transverse edges of said strip having registration indicia disposed therein at uniform longitudinal intervals along said strip and in transverse opposition to one another, opposed pairs of registration indicia being coupled by perforations disposed in said carrier strip whereby said carrier strip can be positioned at and deflected about the registration indicia and the coupling perforations.

4. A blind rivet assembly as defined in claim 3, said assembly including a mandrel comprising:
   a. a cylindrical body having first and second portions of uniform diameter separated by a third portion of reduced diameter, said cylindrical body being slidably disposed within said rivet body;
   b. a rivet forming head depending from a first end of said mandrel external to said rivet body and having an outer diameter coextensive with the outer diameter of said rivet body, said rivet forming head having a beveled surface adjacent said cylindrical body and being adapted to cooperatively engage the end of said rivet body having a reduced inner diameter; and
   c. a pulling head depending from the second end of said mandrel, said pulling head having a diameter which is greater than said mandrel and being spaced from said preformed rivet head.

5. A blind rivet assembly comprising a blind rivet carrier element and a plurality of uniformly spaced rivet bodies, said blind rivet carrier element comprising a malleable metallic strip having said plurality of rivet bodies uniformly disposed thereon, said rivet bodies comprising a preformed rivet head being coupled to said carrier strip by breakable bridging elements therebetween, said preformed rivet head being depended into a cylindrical body having a uniform inner and outer diameter, said inner diameter being extended through said preformed rivet head and the end of said cylindrical body opposite said preformed rivet head being countersunk downwardly from the outer to the inner diameter thereof and including rivet forming means for expanding the end of said cylindrical body to form a blind rivet head, said rivet forming means being disposed within the inner diameter and being in contact with said countersunk portion, said rivet forming means including a cylindrical head coextensive with the outer diameter of said cylindrical body.

* * * * *